H. N. HERRICK.
APPARATUS FOR SEPARATING SOLIDS FROM LIQUIDS.
APPLICATION FILED FEB. 19, 1920.
1,349,881. Patented Aug. 17, 1920.
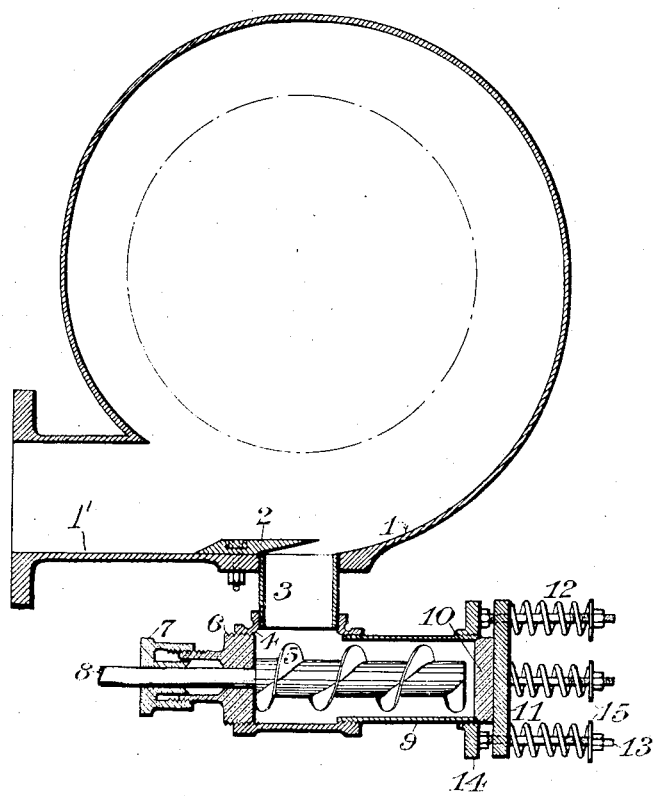
Witnesses
Crighton W. Scholefield.
J. R. Nixon
Inventor
Henry N. Herrick
by Booth & Booth
Attorneys.

UNITED STATES PATENT OFFICE.

HENRY N. HERRICK, OF BAKERSFIELD, CALIFORNIA.

APPARATUS FOR SEPARATING SOLIDS FROM LIQUIDS.

1,349,881.   Specification of Letters Patent.   Patented Aug. 17, 1920.

Application filed February 19, 1920. Serial No. 359,781.

*To all whom it may concern:*

Be it known that I, HENRY N. HERRICK, a citizen of the United States, residing at Bakersfield, in the county of Kern and State of California, have invented certain new and useful Improvements in Apparatus for Separating Solids from Liquids, of which the following is a specification.

My invention relates to the general class of separators.

Though the invention is adapted for the separation of the components of various aggregates wherein a difference in specific gravity and solidity exists, it is especially adapted for the separation of solid matter from liquids, and particularly for the separation of sand and other solid matter from the mud-laden water used in drilling oil wells, to the end that the water may be used over again.

In the drilling of wells by rotary tools it is usual to pump mud-laden water down through the drilling device into the bottom of the hole in order to remove the sand and rock cuttings torn off by the drilling bit, the mud and cuttings returning to the surface outside the drilling device. It is the object of my invention to separate the sand and rock chips from the mud-laden fluid thus returned to the surface, returning the mud-laden fluid to the drilling stem and discarding superfluous solid matter in one operation.

To this end my invention consists in the novel separator which I shall now fully describe, by reference to the accompanying drawing in which the figure is a vertical section of my separator, the impeller of the centrifugal pump member of the apparatus and its inlet connection and the driving connections being omitted, for the sake of clearness.

1 is the casing or volute of a centrifugal pump having the discharge 1'. I have not deemed it necessary to show the inlet-connection nor the impeller of the pump, as these are of the common form. Within the casing, at about the line where the outer wall of the volute merges into the discharge 1', is fitted the deflector 2, and in said wall immediately below the deflector is an outlet to which is fitted the short-pipe section 3 to the lower end of which is fitted the T-coupling 4. In one arm of this coupling is fitted the pipe 9, and in its other arm is fitted the bearing 6, carrying the stuffing box 7, Through the stuffing box 7, and bearing 6, a rotatable shaft 8 passes into the coupling 4 and pipe 9, and said shaft carries the helical flange 5, having an appreciable clearance within the housing formed by said coupling and pipe, as shown. At the end of the pipe 9 is a valve 10, carried by a plate 11, against which the springs 12 act to normally hold the valve closed against the pipe. The springs 12 are held in compression by bolts 13, carried by the flange 14, and said springs are adjusted by washers and nuts 15.

I have not deemed it necessary herein to show the driving connections for the pump 1, and the conveyer shaft 8, as these may assume any form consistent with good practice.

The operation of the apparatus is as follows:

Sand or other solid matter in the mud-laden liquid raised from the well by the centrifugal pump 1, is, by so-called centrifugal force developed in the usual action of the pump, thrown outward, on account of its greater specific gravity, and coming in contact with the deflector 2 is diverted into and through the short-section of pipe 3 and enters the chamber or housing 4—9 of the helical conveyer 5. Some of the mud-laden liquid will, of course accompany the sand or other solid matter into the housing, but the major portion of the liquid will pass out through the discharge 1' of the pump.

In the conveyer chamber or housing the solid matter and such liquid as may accompany it are so affected by the conveyer that as the solid matter accumulates sufficiently to fill one turn of the helix, said solid matter alone will thereafter be carried forward by the helix and forced out through the pipe 9 and valve 10. Owing to the clearance of the helix conveyer in its housing the mud-laden liquid will not be forced out through the valve 10.

I claim:

1. An apparatus for separating solids from liquids comprising a centrifugal pump for rotating the aggregate mass whereby the solid matter is thrown outwardly; means within the pump for intercepting the outwardly thrown solid matter and separately discharging the same; a housing to receive the discharged solid matter, said housing having an outlet; a valve normally closing said outlet; and means within the housing for forcing said solid matter past said valve.

2. An apparatus for separating solids from liquids comprising a centrifugal pump for rotating the aggregate mass whereby the solid matter is thrown outwardly; means within the pump for intercepting the outwardly thrown solid matter and separately discharging the same; a housing to receive the discharged solid matter, and such liquid matter as may accompany the solid matter, said housing having an outlet; a valve normally closing said outlet against the escape of both liquid and solid matter; and means within the housing for forcing the solid matter only past said valve.

3. An apparatus for separating solids from liquids comprising a centrifugal pump to which the aggregate mass is supplied, said pump having a discharge, and having also in advance of said discharge, an outlet in its outer wall for receiving the solid matter thrown outwardly to said wall by the action of the pump; a deflector within the pump to divert said solid matter into said outlet; a housing communicating with said outlet; a valve normally closing said housing; and a rotatable screw-conveyer within said housing adapted to force the solid matter from the housing past said valve.

4. An apparatus for separating solids from liquids comprising a centrifugal pump to which the aggregate mass is supplied, said pump having a discharge, and having also in advance of said discharge, an outlet in its outer wall for receiving the solid matter thrown outwardly to said wall by the action of the pump; a deflector within the pump to divert said solid matter into said outlet; a housing communicating with said outlet; a valve normally closing said housing; and a rotatable screw-conveyer within said housing adapted to force the solid matter from the housing past said valve, said conveyer having a clearance in the housing sufficient to avoid the discharge, past the valve, of the liquid matter.

5. An apparatus for separating solids from liquids comprising a centrifugal pump to which the aggregate mass is supplied, said pump having a discharge, and having also in advance of said discharge, an outlet pipe in its outer wall for receiving the solid matter thrown outwardly to said wall by the action of the pump; a deflector within the pump to divert said solid matter into said outlet pipe; a housing fitted to said outlet pipe to receive the solid matter therefrom; a spring controlled valve adjustably controlling the outlet of said housing; and a rotatable screw conveyer within the housing adapted to force the solid matter therefrom past the valve, said conveyer having a clearance in the housing sufficient to avoid the discharge of the liquid matter past said valve.

In testimony whereof I have signed my name to this specification in the presence of two subscribing witnesses.

HENRY N. HERRICK.

Witnesses:
 CRIGHTON W. SCHOLEFIELD,
 J. R. HIXON.